United States Patent
Jung

(10) Patent No.: US 9,820,130 B2
(45) Date of Patent: Nov. 14, 2017

(54) METHOD FOR CREATING WI-FI P2P GROUP

(75) Inventor: Bu-Seop Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 320 days.

(21) Appl. No.: 13/564,035

(22) Filed: Aug. 1, 2012

(65) Prior Publication Data

US 2013/0034023 A1 Feb. 7, 2013

(30) Foreign Application Priority Data

Aug. 2, 2011 (KR) ........................ 10-2011-0076976

(51) Int. Cl.
| | | |
|---|---|---|
| *H04W 8/00* | (2009.01) | |
| *H04W 88/06* | (2009.01) | |
| *H04W 8/18* | (2009.01) | |
| *H04L 29/08* | (2006.01) | |
| *H04W 4/08* | (2009.01) | |
| *H04W 84/18* | (2009.01) | |
| *H04W 76/00* | (2009.01) | |
| *H04W 76/02* | (2009.01) | |

(52) U.S. Cl.
CPC .......... *H04W 8/005* (2013.01); *H04L 67/104* (2013.01); *H04W 4/08* (2013.01); *H04W 8/186* (2013.01); *H04W 88/06* (2013.01); *H04W 76/002* (2013.01); *H04W 76/023* (2013.01); *H04W 84/18* (2013.01)

(58) Field of Classification Search
CPC ... H04L 67/104; H04L 63/0442; H04L 63/18; H04L 67/1065; H04W 8/186; H04W 4/08; H04W 76/023; H04W 76/002; H04W 8/005; H04W 84/18; H04W 88/06
USPC ........................................................ 370/255
See application file for complete search history.

(56) References Cited

U.S. PATENT DOCUMENTS

| | | | |
|---|---|---|---|
| 6,993,325 B1 | 1/2006 | Waesterlid | |
| 2003/0055892 A1* | 3/2003 | Huitema | ................. H04L 29/06 709/204 |
| 2003/0177219 A1 | 9/2003 | Taib et al. | |
| 2004/0236850 A1* | 11/2004 | Krumm et al. | ............... 709/224 |
| 2005/0036469 A1* | 2/2005 | Wentink | ....................... 370/338 |
| 2005/0130634 A1* | 6/2005 | Godfrey | .................... 455/414.1 |

(Continued)

OTHER PUBLICATIONS

Wi-Fi Alliance Technical Committee P2P Task Group, "WiFi Peer-to-Peer (P2P) Technical Specification" Version 1.1, Oct. 4, 2010, pp. 1-159.*

(Continued)

*Primary Examiner* — Raj Jain
(74) *Attorney, Agent, or Firm* — Jefferson IP Law, LLP

(57) ABSTRACT

A method and an apparatus for creating a Wireless Fidelity (Wi-Fi) Peer-to-Peer (P2P) group are provided. The method includes creating a 1:N P2P group by connecting a third P2P device to a 1:1 P2P group created by setting a first P2P device as a group owner and setting a second P2P device as a group client, transmitting, by the second P2P device, a request message requesting creation of a new P2P group, to the third P2P device, transmitting, by the third P2P device, a response message to the request message, and creating the new P2P group between the second P2P device and the third P2P device through exchange of the request message and the response message.

4 Claims, 9 Drawing Sheets

(56) References Cited

U.S. PATENT DOCUMENTS

| | | | |
|---|---|---|---|
| 2007/0171910 A1* | 7/2007 | Kumar | 370/392 |
| 2009/0316669 A1* | 12/2009 | Javaid et al. | 370/338 |
| 2011/0026504 A1* | 2/2011 | Feinberg | H04W 4/08 |
| | | | 370/338 |
| 2011/0034127 A1 | 2/2011 | Wentink et al. | |
| 2011/0082940 A1 | 4/2011 | Montemurro et al. | |
| 2011/0085529 A1 | 4/2011 | Choi et al. | |
| 2011/0294474 A1* | 12/2011 | Barany | H04W 8/005 |
| | | | 455/414.1 |
| 2012/0290730 A1* | 11/2012 | Desai | H04L 67/104 |
| | | | 709/228 |
| 2012/0300698 A1* | 11/2012 | Lindner et al. | 370/328 |
| 2013/0034023 A1* | 2/2013 | Jung | H04L 67/104 |
| | | | 370/255 |

OTHER PUBLICATIONS

IEEE, IEEE Standard for Information Technology Telecommunication and information exchange between systems—Local and metropolitan area networks—Specific requirements—Part 11: Wireless LAN Medium Access Control (MAC) and Physical Layer (PHY) specifications Amendment 7: Extensions to Direct-Link Setup (DLS), pp. 65-68, Oct. 14, 2010.*

Wi-Fi Alliance Technical Committee P2P Task Group, "WiFI Peer-to-Peer (P2P) Technical Specificaiton" Version 1.1 Oct. 4, 2010, pp. 1-159.*

Wi-Fi Alliance, Wi-Fi Peer-to-Peer (P2P) Technical Specification version 1.1, XP009163866, Jan. 1, 2010, pp. 1-159.

* cited by examiner

TABLE 63-SERVICE PROTOCOL TYPES

| VALUE | MEANING |
|---|---|
| 0 | All SERVICE PROTOCOL TYPES |
| 1 | BONJOUR |
| 2 | UPNP |
| 3 | WS-DiSCOVERY |
| 4-254 | RESERVED |
| 255 | VENDOR SPECIFIC |

TABLE 65-SERVICE DISCOVERY STATUS CODES

| VALUE | MEANING |
|---|---|
| 0 | Success |
| 1 | SERVICE PROTOCOL TYPE NOT AVAILABLE |
| 2 | REQUESTED INFORMATION NOT AVAILABLE |
| 3 | BAD REQUEST |
| 4-255 | RESERVED |

FIG.3C

| VENDOR SPECIFIC QUERY DATA/RESPONSE DATA | | |
|---|---|---|
| VENDOR NAME (EX : SAMSUNG, BADA) | SERVICE TYPE (EX : P2PLINKCREATION) | DATA |
| | | · LINKTYPE: 0→TEMPORARY GROUP<br>　　　　　 1→PERSISTENT GROUP<br>· FLAG: 0→UPDATE<br>　　　　 1→NEW LINK START<br>· REFERENCE SSID LISTS<br>　- QUERY : REQUESTED SSID LISTS<br>　- RESPONSE : SELECTED SSID<br>· TARGET SSID NAME<br>· GROUP OWNER INTENT<br>· PREFERRED CHANNEL LIST<br>　- QUERY : REQUESTED OPERATING CHANNEL LISTS<br>　- RESPONSE : SELECTED OPERATING CHANNEL |

FIG.3D

METHOD FOR CREATING WI-FI P2P GROUP

PRIORITY

This application claims the benefit under 35 U.S.C. §119 (a) of a Korean Patent Application filed in the Korean Intellectual Property Office on Aug. 2, 2011 and assigned Serial No. 10-2011-0076976, the entire disclosure of which is hereby incorporated by reference.

BACKGROUND OF THE INVENTION

1. Field of the Invention

The present invention relates to the use of Wireless Fidelity (Wi-Fi) Direct. More particularly, the present invention relates to the creation of a Wi-Fi Peer-to-Peer (P2P) group using Wi-Fi Direct.

2. Description of the Related Art

In general, a portable terminal may take the form of a mobile phone, a tablet computer, a smart phone, or the like. A portable terminal provides a user with a variety of useful functions through applications which provide a variety of different functions. For example, a portable terminal may provide a user with functionality associated with Wireless Fidelity (Wi-Fi) Direct technology. Wi-Fi Direct is also referred to as Wi-Fi P2P technology.

Functionality associated with Wi-Fi Direct technology, which has been proposed by the Wi-Fi Alliance, is being focused on.

Wi-Fi Direct technology is a new communication technology in which devices supporting Wi-Fi Direct (or even when multiple devices, of which only one device supports Wi-Fi Direct) can communicate with each other and share information with each other, without having to communicate with a router or an Access Point (AP).

The Wi-Fi Direct technology has some similarities with Bluetooth in terms of communication between devices. However, in terms of transmission range and data transmission rate, the Wi-Fi Direct technology has more advantages than the Bluetooth technology. For example, Bluetooth technology has certain limitations associated with a transmission distance and a transmission speed. Therefore, the function of the Wi-Fi Direct technology is expected to quickly replace the Bluetooth technology. For example, Bluetooth 4.0, which is the latest Bluetooth specification, supports a maximum transmission range of 100 m and a maximum transmission rate of 24 Mbps. In contrast to the Bluetooth 4.0 technology, the Wi-Fi Direct technology supports a maximum transmission range of 200 m and a maximum transmission rate of 300 Mbps.

According to the Wi-Fi Direct, a P2P group is formed among devices, so as to form a Wi-Fi P2P network. A P2P group includes a device operating as a Group Owner (GO) and a device operating as a Group Client (GC).

When a P2P group is formed according to the Wi-Fi Direct technology, devices perform a process of determining an attribute of a P2P group as either a temporary group or a persistent group, together with a group owner negotiation process of determining whether a device operates as a GO or as a GC.

When the attribute of the P2P group has been determined as a persistent group and the P2P group corresponding to the persistent group is again created (e.g., formed), devices belonging to the P2P group enable the omission of a variety of processes required to form a P2P group, so that a P2P group can be quickly formed. Such an attribute of the P2P group is determined by a user of a device (e.g., a P2P device) belonging to the P2P group in a step of forming a P2P group (e.g. a group owner negotiation process).

When the speed of subsequently forming the identical P2P device and P2P group is considered, it may be desirable that an attribute of the P2P group be determined as a persistent group. However, from the viewpoint of the user of the P2P device, there may be a case (i.e., an attribute of the P2P group is determined as a temporary group) in which a P2P group is intended to be temporarily formed. For example, in such a case, a user of the P2P device may only intend that the P2P group be temporarily formed once.

Meanwhile, the current specification associated with Wi-Fi Direct technology does not provide a function in which a user of a P2P device can conveniently change the attribute of the P2P group as the need arises after an attribute of a P2P group is determined when the P2P group is formed. For example, after a P2P group is first determined when the P2P group is formed, the current specification associated with Wi-Fi Direct technology does not allow a user of a P2P device to conveniently change the attribute of the P2P group.

Also, the specification associated with Wi-Fi Direct technology prescribes that the attribute of the P2P group is effective as the persistent group when a P2P device, which is set as a GO, and a P2P device, which is set as a GC, are connected to each other only in one-to-one correspondence. Namely, the P2P device, which has been set as the GO in the P2P group which has been set as the persistent group, continuously operates as the GO even when the identical P2P group is again created. In order to normally use the P2P group which has been set as the persistent group, the P2P device operating as the GO is absolutely required.

This restriction of the existing Wi-Fi Direct specification has problems exposed when a 1:N P2P group is created by connecting another P2P device to a P2P group (1:1 P2P group) in which two P2P devices (i.e., one of which is the GO, and the other being the GC) are connected one-to-one to each other. These problems will be described below with reference to FIG. 1A.

FIG. 1A is an illustrative view of a Wi-Fi P2P group created by a Wi-Fi Direct function according to the related art.

Referring to FIG. 1A, when a P2P device B is newly connected to a 1:1 P2P group and a 1:N P2P group is formed in a state in which a P2P device operating as a GO (i.e., the P2P Group Owner) and a P2P device A operating as a GC form the 1:1 P2P group as a persistent group, the existing specification associated with Wi-Fi Direct technology has a problem in that an attribute of a persistent group is applied only between the P2P group owner and the P2P device A, and an attribute of the persistent group or a temporary group cannot be selected between the P2P device A and the P2P device B newly connected to the 1:1 P2P group.

Namely, the existing specification associated with Wi-Fi Direct technology has an inconvenience in that the setting of the persistent group cannot be separately applied to devices (e.g. the P2P device A, and the P2P device B) each operating as a GC in the state of maintaining the 1:N P2P group.

Referring to FIG. 1A, for example, when the P2P group owner does not operate in the state where three P2P devices including the P2P group owner, the P2P device A and the P2P device B form the 1:N P2P group, the P2P device A and the P2P device B cannot perform communication any more. Thereafter, when the P2P device A and the P2P device B are intended to form a P2P group, it is necessary to perform all processes required to form the P2P group, and thus a lot of time is required to form the P2P group.

Therefore, a need exists for an apparatus and method which, which, when a P2P group is formed by using Wi-Fi Direct technology and is then used while compatibility is maintained in compliance with a Wi-Fi Direct specification, can more flexibly and conveniently change an attribute of the P2P group at a request of a user.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and method which, when a P2P group is formed by using Wi-Fi Direct and is then used while compatibility is maintained in compliance with a Wi-Fi Direct specification, can more flexibly and conveniently change an attribute of the P2P group at a request of a user, and can apply the setting of a persistent group even between P2P devices each operating as a GC in the P2P group and enables the P2P devices each operating as the GC to quickly create a P2P group.

In accordance with an aspect of the present invention, a method for creating a wireless fidelity (Wi-Fi) peer-to-peer (P2P) group is provided. The method includes creating a 1:N P2P group by connecting a third P2P device to a 1:1 P2P group created by setting a first P2P device as a group owner and setting a second P2P device as a group client, transmitting a request message requesting creation of a new P2P group, from the second P2P device to the third P2P device, transmitting a response message to the request message by the third P2P device, and creating the new P2P group between the second P2P device and the third P2P device through exchange of the request message and the response message.

In accordance with another aspect of the present invention, a method for creating a wireless fidelity (Wi-Fi) peer-to-peer (P2P) group is provided. The method includes transmitting a request message requesting a change of a group attribute of a P2P group created by a first P2P device and a second P2P device, from the first P2P device to the second P2P device, transmitting a response message matched with the request message from the second P2P device to the first P2P device, and changing the group attribute of the P2P group through exchange of the request message and the response message, by the first P2P device and the second P2P device.

In accordance with another aspect of the present invention, a method for creating a wireless fidelity (Wi-Fi) peer-to-peer (P2P) group is provided. The method includes searching a stored access point (AP) list for an AP to which a first P2P device is capable of connecting, and transmitting a request message making a request for creating a P2P group of the first P2P device and a second P2P device by using the AP, to which the first P2P device is capable of connecting, to the second P2P device, by the first P2P device, identifying a service set identifier (SSID) of the AP, to which the first P2P device is capable of connecting, included in the request message, and identifying whether the AP, to which the first P2P device is capable of connecting, exists in a stored AP list of the second P2P device, by the second P2P device, transmitting a response message matched with a result of the identification, from the second P2P device to the first P2P device, when the result of the identification shows that the AP, to which the first P2P device is capable of connecting, exists in the stored AP list of the second P2P device, and creating the P2P group, the creation of which has been requested, by the first P2P device and the second P2P device.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 3C is an explanatory view of a Service Protocol Type and a Status Code such as, for example, the Service Protocol Type and Status Code illustrated in FIG. 3A and FIG. 3B according to an exemplary embodiment of the present invention;

FIG. 3D is an illustrative view of data included in a message exchanged for creating a P2P group according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
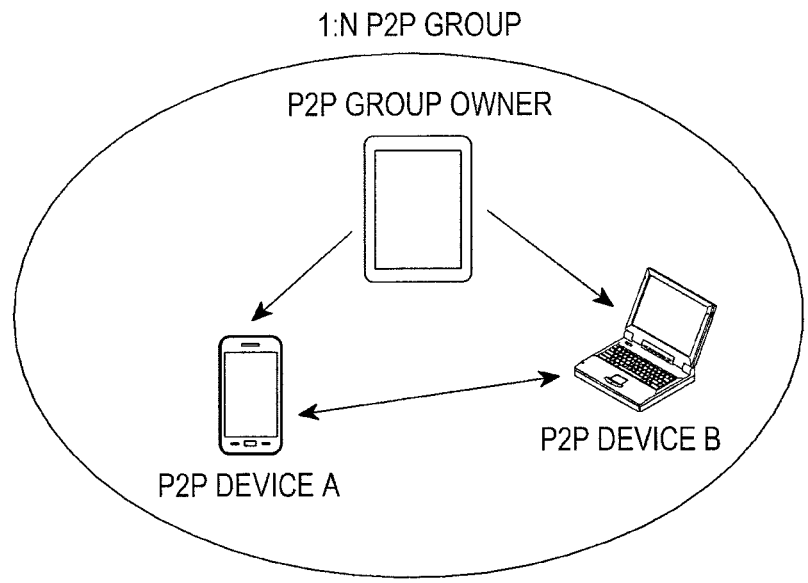
FIG. 1A is an illustrative view of a Wi-Fi P2P group created by a Wi-Fi Direct function according to the related art.
Figure 1B:
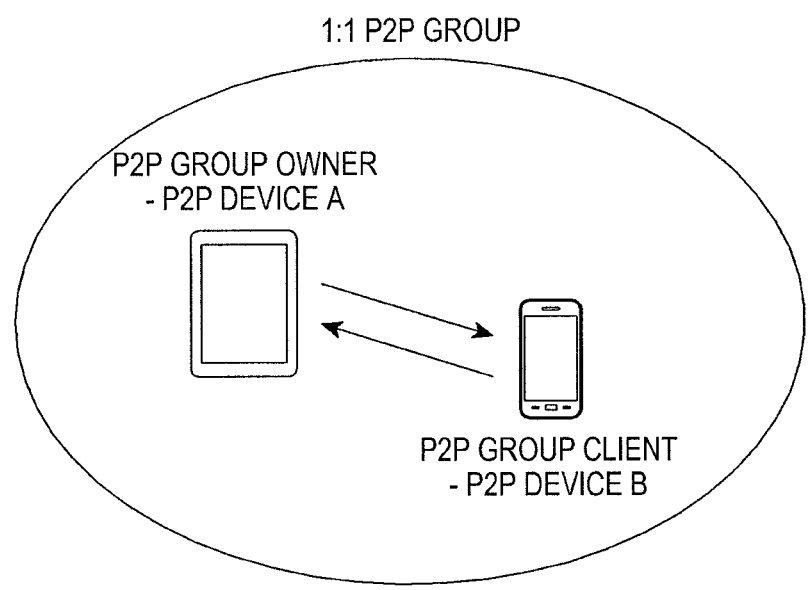
FIG. 1B is an illustrative view of a Wi-Fi P2P group created by a Wi-Fi Direct function according to the related art.
Figure 1C:
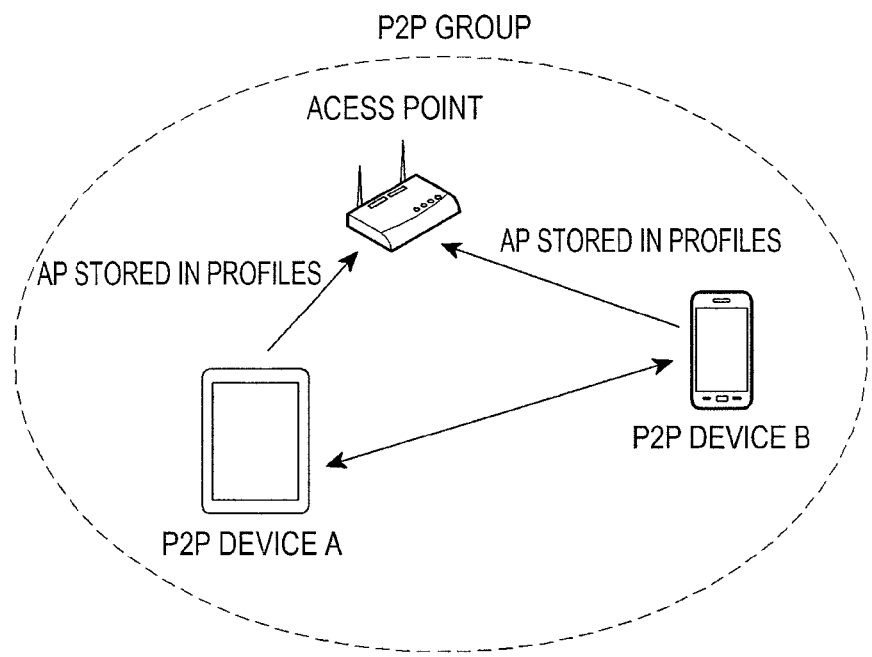
FIG. 1C is an illustrative view of a Wi-Fi P2P group created by a Wi-Fi Direct function according to the related art.

FIG. 1A is an illustrative view of a Wi-Fi P2P group (or P2P group) formed by a Wi-Fi Direct function according to the related art. FIG. 1B is an illustrative view of a P2P group formed by a Wi-Fi Direct function according to the related art. FIG. 1C is an illustrative view of a P2P group formed by a Wi-Fi Direct function according to the related art.

Referring to FIG. 1A to FIG. 1C, a P2P group includes devices communicating wirelessly. For example, the devices may be portable terminal devices, such as a notebook computer, a tablet PC (Personal Computer), a smart phone, and the like. Wi-Fi Direct provides a function in which a device including a communication module, which complies with Institute of Electrical and Electronics Engineers (IEEE) 802.11 corresponding to technology standards of the Wireless Local Area Network (WLAN), can form (e.g., or create) a P2P group.

For example, a device which includes a communication module having a new technology standard (e.g. 802.11g or 802.11n) of IEEE 802.11 and which is certified by Wi-Fi Direct, can form a P2P group. Therefore, devices (e.g. a TV, a printer, a camera, and the like) other than a portable terminal illustrated in FIG. 1A to FIG. 1C may also be connected to the P2P group.

As noted in FIG. 1A, a P2P group is formed by a P2P device (P2P group owner, e.g. a tablet PC) operating as a GO, and a P2P device A (e.g. a smart phone) and a P2P device B (e.g. a notebook computer), each operating as a GC. In this respect, FIG. 1 illustrates an example of creating a 1:N P2P group, in which three or more P2P devices form a P2P group.

FIG. 1B illustrates an example in which two P2P devices (i.e., a P2P device A such as, for example, a tablet PC and a P2P device B such as, for example, a smart phone) create a 1:1 P2P group.

FIG. 1C illustrates an example in which a P2P device A and a P2P device B create a P2P group by using an Access Point (AP) which is stored in both an AP list (e.g., an AP profile) of the P2P device A and an AP list of the P2P device B.

Exemplary embodiments of the present invention using the examples of creating a P2P group explained in FIG. 1A to FIG. 1C, respectively, will be described below.

Figure 2:
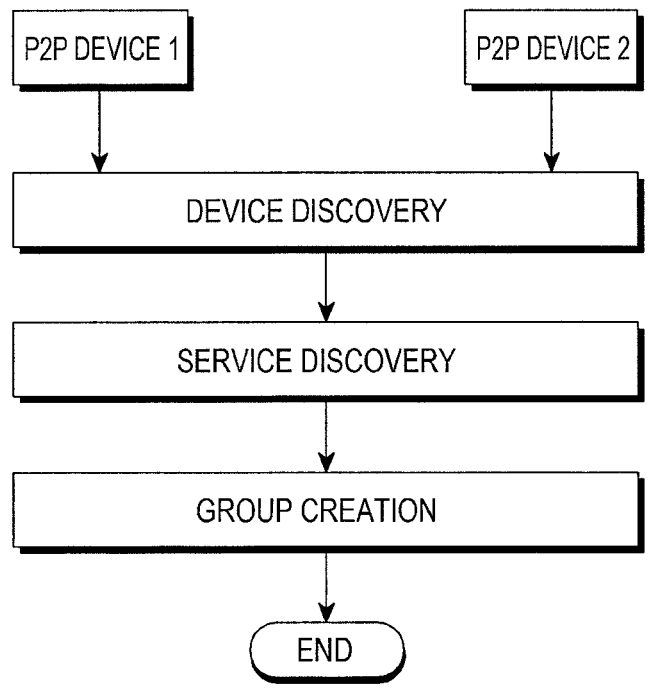
FIG. 2 is a flowchart schematically illustrating a process in which Wi-Fi Direct-certified devices to create a Wi-Fi P2P group according to an exemplary embodiment of the present invention.

FIG. 2 is a flowchart schematically illustrating a process in which Wi-Fi Direct-certified devices to create a P2P group according to an exemplary embodiment of the present invention. A process of creating a P2P group will be briefly described below with reference to FIG. 2.

A Wi-Fi P2P group is formed by three main processes corresponding to device discovery, service discovery, and group creation. The three main processes will be described below in the order of device discovery, service discovery, and group creation.

Device Discovery

A process in which devices supporting Wi-Fi connect to each other by a Wi-Fi Direct function is called the creation (e.g., or formation) of a P2P group. A device discovery process is a procedure required in order to form a Wi-Fi P2P group. The device discovery process relates to the process by which Wi-Fi P2P devices (e.g. P2P devices 1 and 2) recognize each other and configure a connection therebetween.

A Wi-Fi P2P device (e.g. a P2P device 1), which has entered a device discovery mode according to entrance to a menu intended to use the Wi-Fi Direct function or at a request of an application intending to use the Wi-Fi Direct function, discovers neighboring Wi-Fi P2P devices by repeating channel scan and listen, and search using the IEEE 802.11 standard on a predetermined cycle. A basic operation of the device discovery process performed in the process of forming the Wi-Fi P2P group is performed by mutually exchanging a probe request message and a probe response message, which are used in the IEEE 802.11 Medium Access Control (MAC) protocol. A probe request message includes information such as, for example, P2P IE, Wi-Fi Simple Configuration (WSC) IE, and Supp Reg IE. A probe response message includes information such as, for example, P2P IE, WSC IE, RSN IE, and Supp Reg IE.

Service Discovery

Service discovery may be performed in the device discovery process as described above and in a group creation process to be described below, and may be selectively performed. A service discovery process is performed in order to provide a function in which P2P devices exchange a request message and a response message therebetween and in which P2P devices identify a service protocol, services, and the like, which can be supported by the P2P devices. In the service discover process, the P2P devices exchange information on services, which can be provided by them, therebetween.

For example, assuming that a P2P device 1 is a camera and a P2P device 2 is a printer, when a user of the P2P device 1 intends to output a photograph, the P2P device 1 needs to identify whether the P2P device 2 supports a photograph output function. Therefore, the P2P device 1 may identify, through the service discovery, whether the photograph output function of the P2P device 2 can be performed.

In an example in which it is assumed that a request is made for file sharing between the P2P device 1 and the P2P device 2 through the formation of the Wi-Fi P2P group, when the P2P device 1 employs a Universal Plug and Play (UPNP)-based file sharing scheme whereas the P2P device 2 employs a Web Service)-based file sharing scheme, file sharing between the two devices will not be accomplished.

Group Creation

There is a need for a process of determining a device which is to operate as a group owner playing a central role of a P2P group in Wi-Fi Direct.

In Wi-Fi Direct, in order to create a Wi-Fi P2P group, the P2P devices (e.g., the P2P device 1 and the P2P device 2) perform provision discovery. Herein, this provision discovery is one of important features defined by the specification associated with Wi-Fi Direct technology.

The P2P devices in Wi-Fi Direct basically operate based on Wi-Fi Simple Configuration (WSC). For example, the P2P devices in Wi-Fi Direct basically operate based on Wi-Fi Protected Setup (WPS). In existing Wi-Fi standards, the support of WSC by a connection device is optional. However, support of WSC is a mandatory attribute in Wi-Fi Direct technology. For example, P2P devices compatible with Wi-Fi Direct must support WSC.

WSC which is a function provided in order to make a wireless connection more convenient, includes a Push Button Configuration (PBC) scheme in which a button must be pushed, and a Personal Identification Number (PIN) scheme in which a PIN number must be input. Both the PBC scheme and the PIN scheme cause inconvenience in that setting must be completed within 120 seconds. In an example of the PBC scheme, only if a WPS button is pushed in a counterpart device within 120 seconds after a device on one side requests a wireless connection in the PBC scheme, will a WSC registration protocol be initiated, and SSID (Service Set IDentifier) and credentials (e.g., which are the sum of cryptographic information and include information, such as an authentication type, an encryption type, a network key, an SSID, and the like) required for the wireless connection are exchanged.

A specification which has been newly defined by Wi-Fi Direct in order to resolve this inconvenience of the conventional WSC, is a provision discovery scheme. The provision discovery scheme is a scheme in which when a connection is attempted in the conventional WSC (e.g., using the PBC scheme or the PIN scheme) after a predetermined Wi-Fi P2P device (e.g., the P2P device 1) discovers another Wi-Fi P2P device (e.g., the P2P device 2), the attempt of the connection is notified to a user of another Wi-Fi P2P device by transmitting a WSC configuration method message to the user of another Wi-Fi P2P device.

The WSC configuration method messages are classified into types, such as a PBC, a PIN from display, a PIN from keypad, and the like. A message PBC may notify that a user of another Wi-Fi P2P device pushes a button of another Wi-Fi P2P device. Messages, a PIN from display, and a PIN from keypad may notify the attempt of the Wi-Fi P2P connection to the user of another Wi-Fi P2P device by an event for displaying a PIN number to another Wi-Fi P2P device or receiving a PIN number as input through another Wi-Fi P2P device.

When a user of the P2P device 1 and the user of the P2P device 2 first accept the Wi-Fi P2P connection and then the P2P device 1 and the P2P device 2 complete the provision discovery, a group owner negotiation process is performed between the Wi-Fi P2P devices.

The group owner negotiation process is performed through the exchange of a GO negotiation request, a GO negotiation response, and a GO negotiation confirm frame. Herein, the GO negotiation request and the GO negotiation response include P2P IE information and WSC IE information, respectively.

A field of the P2P IE includes information, such as, for example, P2P Capability, P2P Device Info, Group Owner Intent, Configuration Timeout, Listen Channel, Extended Listen Timing, Intended P2P Interface Address, Channel List, and Operating Channel attributes. A field of the WSC-IE includes information, such as, for example, a device password ID, a manufacturer, a model name, a model number, a serial number, and a device name.

The P2P device 1 and the P2P device 2 compare intent (e.g., Group Owner Intent) values included in the P2P IE. Then, a device having a large intent value is determined as a GO, and a device having a small intent value is determined as a GC.

When the P2P device 1 and the P2P device 2 are determined to be a GO and a GC, respectively, the group owner negotiation process is completed, and the P2P device 1, which is set as the group owner, operates as a WSC registrar and the P2P device 2, which is set as a group client, operates as a WSC Enrollee. At this time, if provisioning in which and the P2P device 1 and the P2P device 2 exchange credentials with each other is completed, the group setting process of forming a Wi-Fi P2P group is completed.

Meanwhile, in the group owner negotiation process, an attribute of the P2P group is also determined. An attribute of the P2P group is determined as either a temporary group or a persistent group. A temporary group corresponds to a case in which the formed P2P group is used only once, and a persistent group corresponds to a case in which the formed P2P group is continuously used.

When the created P2P group is set as a persistent group, each of P2P devices of the relevant P2P group stores credentials and information on a role (e.g., a group owner or group client) of each P2P device in the P2P group. Accordingly, when a request is subsequently made for forming of a P2P group, processes such as provision discovery, group owner negotiation and provisioning may be omitted, and the P2P group may be quickly formed. As a result, a connection speed can be improved. For example, when a device discovered by the device discovery is a device belonging to the P2P group which has already been formed as a persistent group, a device corresponding to a group owner may create a P2P group through the exchange of information (e.g., invitation request/response) including information on an attribute of a P2P group, and a device corresponding to a group client may quickly access to the created P2P group by using the stored credentials.

Thereafter, when the group creation process is completed, the device corresponding to the group owner moves to an operating channel and starts a role as the group owner, and the device corresponding to the group client accesses to the group owner by using the credentials identified through the provisioning. Finally, the two devices are connected to each other as the Wi-Fi P2P group.

Figure 3A:
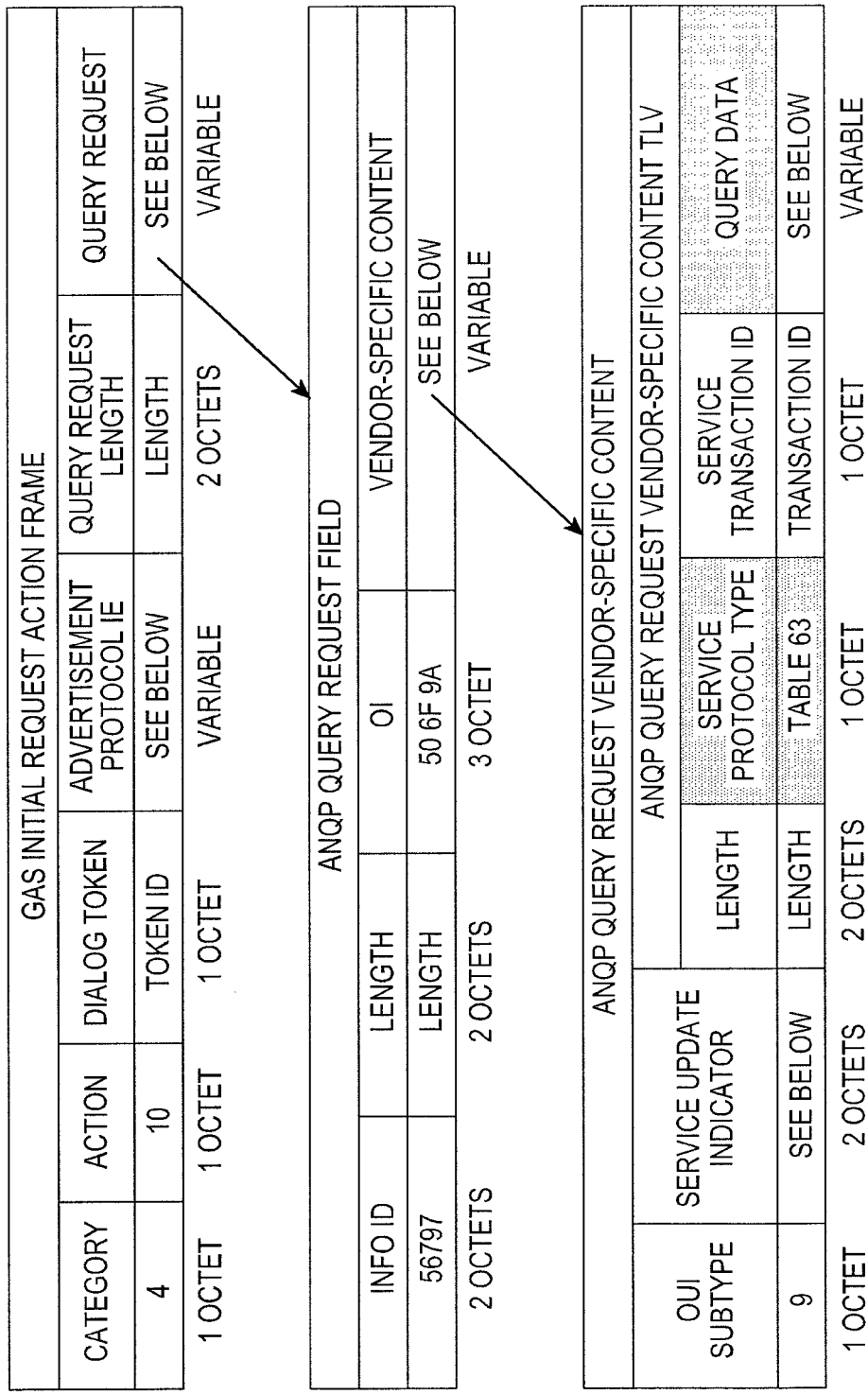
FIG. 3A is an illustrative view of a request message exchanged in a service discovery process of a P2P group in Wi-Fi Direct according to an exemplary embodiment of the present invention.
Figure 3B:
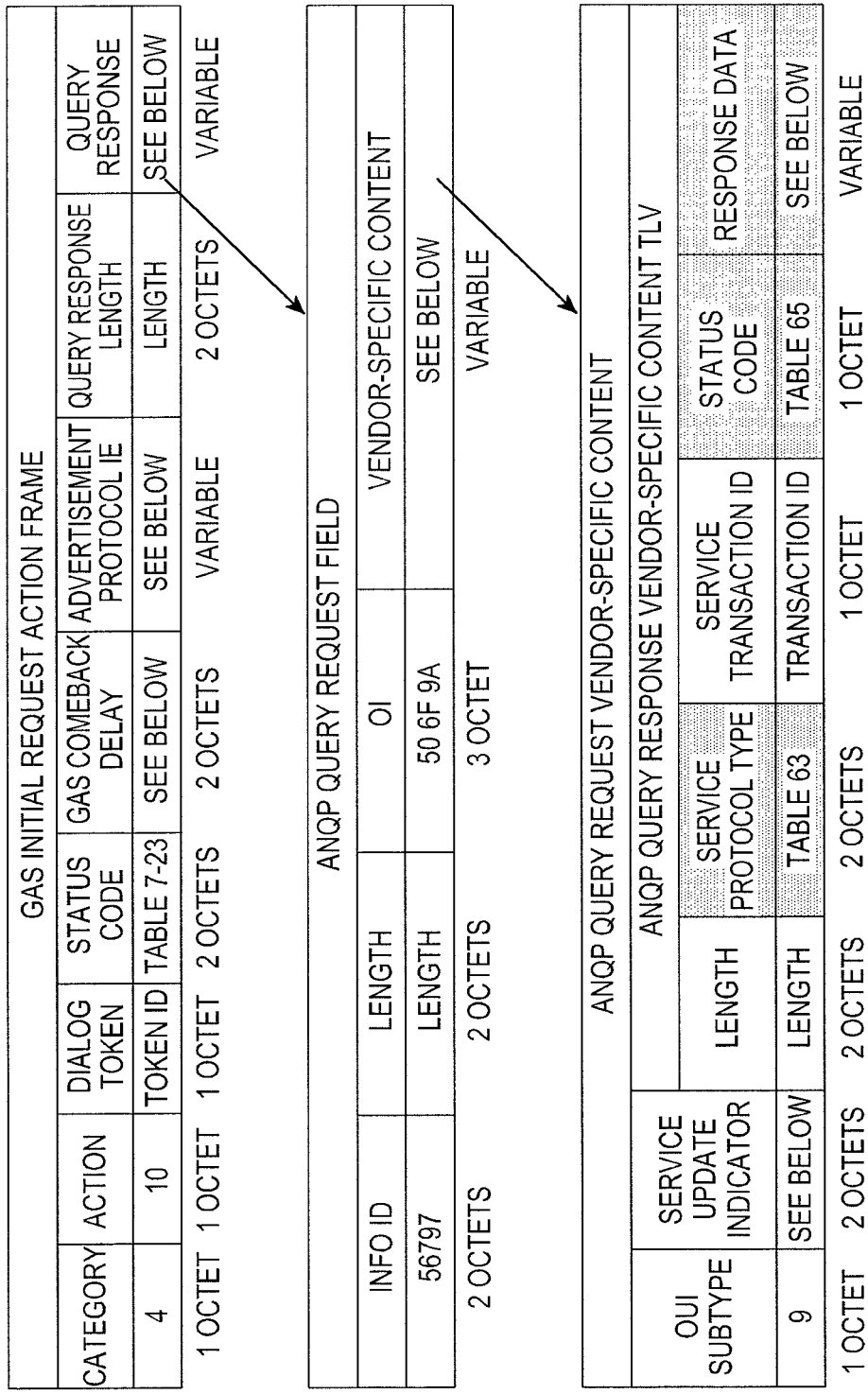
FIG. 3B is an illustrative view of a response message exchanged in a service discovery process of a P2P group in Wi-Fi Direct according to an exemplary embodiment of the present invention.

FIG. 3A is an illustrative view of a request message exchanged in a service discovery process of a P2P group in Wi-Fi Direct according to an exemplary embodiment of the present invention. FIG. 3B is an illustrative view of a response message exchanged in a service discovery process of a P2P group in Wi-Fi Direct according to an exemplary embodiment of the present invention.

According to exemplary embodiments of the present invention, a request message and a response message such as the request message and the response message illustrated in FIG. 3A and FIG. 3B, respectively, are exchanged in the service discovery process described with reference to FIG. 2.

In the Wi-Fi Direct specification, a request message and a response message exchanged in a service discovery process make use of fields (i.e., an ANQP Query Request Field and an ANQP Query Response Field) of Vendor-specific Content of Generic Advertisement Service (GAS) protocol Frames (e.g., a Generic Advertisement Service Initial Request Action Frame, and a Generic Advertisement Service Initial Response Action Frame) defined by a wireless communication standard such as, for example, the existing IEEE 802.11u standard. This is because it is possible to apply the above fields to the above request message and response message and use the request message and response message, to which the above fields have been applied, as the need of a manufacturer (or provider) arises.

An exemplary embodiment of the present invention can be understood through a Service Protocol Type and Query Data of the request message illustrated in FIG. 3A, and a Service Protocol Type, a Status Code, and Response Data of the response message illustrated in FIG. 3B. Therefore, these data fields are described below.

The type of a Service Protocol to be used in a P2P group to be formed is designated in a Service Protocol Type of the request message illustrated in FIG. 3A, and service information matched with the designated Service Protocol is included in Query Data of the request message illustrated in FIG. 3A. The response message illustrated in FIG. 3B is obtained by adding a Status Code to the request message illustrated in FIG. 3A.

Referring to FIG. 3C which is an explanatory view of the Service Protocol Type and the Status Code illustrated in FIG. 3A and FIG. 3B, the Service Protocol Types are prescribed so that Service Protocol Types can be used to divide types of Service Protocols into all protocol types, PnP, Bonjour, and WS-Discovery according to discrimination between values of the Service Protocol Types, and so that the remaining 252 values corresponding to 4 to 245 and 255 can be used according to a subsequent extension and the discretion of a manufacturer.

Also, the Status Codes shown in FIG. 3C are prescribed so that the States Codes are used to divide response results of the service discovery according to discrimination between values of the Status Codes, and so that the remaining 252 values corresponding to 4 to 255 can also be used during a subsequent extension.

Meanwhile, according to an exemplary embodiment of the present invention, Query Data and Response Data of a Vendor-specific Content field in the GAS protocol Frame are modified and then used, and the Vendor-specific Content field is used so that it is possible to maintain compatibility with the existing Wi-Fi Direct specification. This configuration can be identified with reference to FIG. 3D.

FIG. 3D is an illustrative view of data included in a message exchanged for creating a P2P group according to an exemplary embodiment of the present invention.

Referring to FIG. 3D, an exemplary embodiment of the present invention uses Query Data and Response Data through the configuration of a Vendor name, a Service type and Data, and this configuration will be described below.

Vendor Name

According to discrimination between Vendor names, an exemplary embodiment of the present invention discriminates between a method for creating a P2P group according to the existing Wi-Fi Direct specification and a method for creating a P2P group according to an exemplary embodiment of the present invention. The Vendor name is used to discriminate a name (e.g., Samsung) of a device manufacturer from another name of another device manufacturer, and thus enables discrimination between a protocol, which is commonly used between devices manufactured by one vendor (e.g., Samsung), and another protocol. Otherwise, the Vendor name is used to discriminate an open Operating System (OS) (e.g., Bada or Android) from another open OS, and thus enables discrimination between a protocol, which can be commonly used between compatible OSs, and another protocol.

Service Type

A Service type field is used to discriminate a particular Vendor specific Service, to which a request (or query) is intended to be sent or a response is intended to be made, from another service. An exemplary embodiment of the present invention may declare a field named "P2PLinkCreation" in the Service type field, and may specify that a dedicated service provided by a manufacturer is the creation of a link of a P2P group.

Data

A Data field may include items, such as Link Type, Flags, Reference SSID lists, Target SSID name, Group Owner Intent, and Preferred Channel list.

Link Type represents an attribute of a P2P group intended to be created through the exchange of messages. For example, when an attribute of a P2P group intended to be created is a temporary group, Link Type has a value of zero. In contrast, when an attribute of a P2P group intended to be created is a persistent group, Link Type has a value of 1. Therefore, discrimination may be made between attributes of P2P groups intended to be created.

Flags are used to prescribe the purpose of creating a P2P group. When an already-set attribute of a P2P group is intended to be changed, Flags may have a value of zero. When a new P2P group is intended to be created, Flags may have a value of 1.

Discrimination of Reference SSID Lists from other Reference SSID Lists depends on the type of message (i.e., a request message or a response message) exchanged in a service discovery process.

A P2P device which transmits a request message in a service discovery process, includes Requested SSID Lists in Reference SSID Lists. Herein, the Requested SSID Lists include an AP or SSID lists of a group owner, which may bring credential information required for a P2P connection between P2P devices. A P2P device which transmits a response message in the service discovery process, includes Selected SSID in Reference SSID Lists. Herein, the Selected SSID includes information of an SSID selected from among Requested SSID Lists included in the request message.

At this time, when there is no SSID which may be selected from among the Requested SSID Lists included in the request message, the P2P device which transmits the response message, may assign 2 or 3 as the value of a Status Code shown in FIG. 3C, and may respond to the P2P device, which has transmitted the request message, by using a code of Request Information not Available or Bad Request.

When use is made of credentials of the existing network (e.g., an already-used AP), Target SSID name may be used to uniquely (i.e., so as to be identifiable) designate a name of a P2P group intended to be newly created.

When a P2P group is created, Group Owner Intent is used to determine a GO and a GC, and has been described above with reference to FIG. 2. An exemplary embodiment of the present invention inserts Group Owner Intent into a request message and a response message exchanged in service discovery. Accordingly, when a P2P device is added to an already-formed P2P group (e.g. 1:1 P2P group) and a new P2P group (e.g. 1:N P2P group) is created, the request message and the response message into which the Group Owner Intent has been inserted, is used to create a new P2P group from P2P devices, each corresponding to a GC.

Preferred Channel list is used to transmit a list of available channels and transmit information on a channel selected from among the transmitted list of available channels.

For example, in order to provide information on a list of available channels, a P2P device which transmits a request message in a service discovery process as described above with reference to FIG. 2, includes Requested Operating Channel Lists in Preferred Channel list, and transmits a request message including the Preferred Channel list. Also, a P2P device which transmits a response message in the service discovery process, includes information on Selected Operating Channel in Preferred Channel list, so as to transmit a response message including information on a channel selected from among Requested Operating Channel Lists.

Exemplary embodiments of the present invention will be described below based on the description made above with reference to FIG. 1A to FIG. 3D.

Figure 4A:
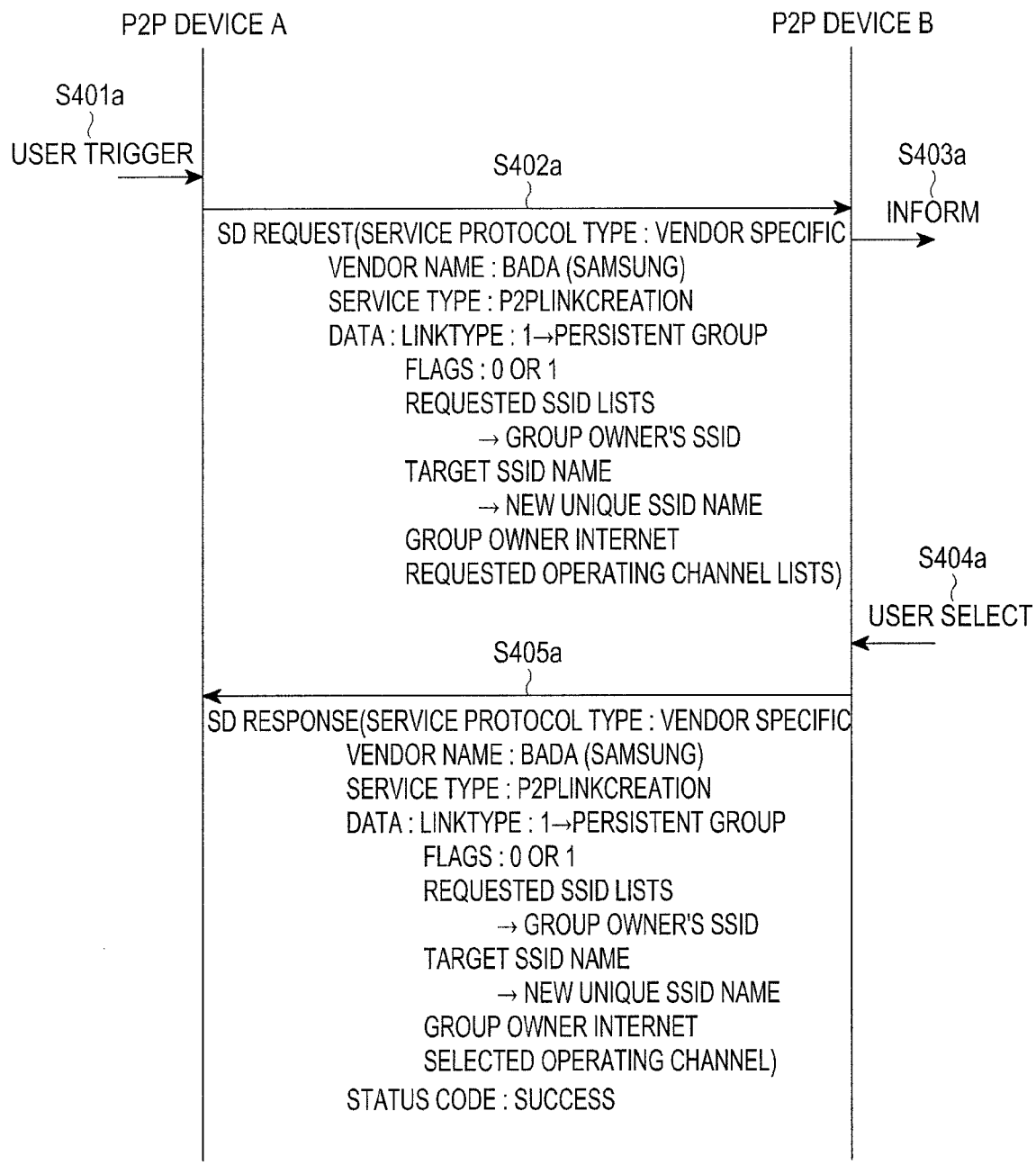
FIG. 4A is a flowchart illustrating a process of creating a P2P group according to a first exemplary embodiment of the present invention.

FIG. 4A is a flowchart illustrating a process of creating a P2P group according to a first exemplary embodiment of the present invention. The first exemplary embodiment of the present invention will be described below based on the description made above with reference to FIG. 1A to FIG. 3C.

The first exemplary embodiment of the present invention will be described with reference to FIG. 1A. The first exemplary embodiment of the present invention pertains to a previous designation of a new P2P group between the device A corresponding to a GC and the P2P device B, when the P2P device B is additionally connected to a 1:1 P2P group and the 1:1 P2P group becomes a 1:N P2P group in a state in which a P2P device corresponding to a P2P group owner and the P2P device A have formed the 1:1 P2P group.

Referring to FIG. 4A, in steps S401a and S402a, at a request of a user, the P2P device A transmits a request message (e.g., an SD request) suitable for the creation of a P2P group of the P2P device A and the P2P device B, as described above with reference to FIG. 3A to FIG. 3D.

The P2P device A designates Vendor Specific for a Service Protocol Type, so as to designate the use of a service protocol designated by a manufacturer, and declares Query Data as shown in FIG. 4A and transmits a request message including the Query Data to the P2P device B.

More specifically, Query Data of a request message transmitted in step S402a includes a Vendor name designated as, for example, Bada (or Samsung), and a Service Type is designated as P2PLinkCreation. Also, the value of a Link Type is designated as 1, so as to set a persistent group for an attribute of a P2P group to be created by the P2P device A and the P2P device B. In Data, the value of a Link Type is designated as 1, the value of Flags is designated as 0, an SSID of a GO (an SSID of the P2P group owner as shown in FIG. 1A) is designated for Requested SSID Lists, a Target SSID name is designated as an SSID of a P2P group to be formed between the P2P device A and the P2P device B, an intent value of a P2P device A itself is designated for a Group Owner Intent, and information on a list of available channels is designated for Requested Operating Channel Lists.

Meanwhile, when the value of a Link Type is designated as 0, an attribute of a P2P group to be created by the P2P device A and the P2P device B is determined as a temporary group. Also, although the value of Flags may be designated as 0 or 1, in the first embodiment of the present invention, it is desirable that the value of Flags is designated as 1 and notice is given of the formation of a new P2P group between the P2P device A and the P2P device B.

In step S403a to S405a, the P2P device B notifies a user of the contents (e.g., the contents of creation of a new P2P group of the P2P device A and the P2P device B) of a request message received from the P2P device A. When the user selects the creation of a P2P group of the P2P device B and the P2P device A, the P2P device B transmits a response message (e.g., an SD response) to the P2P device A.

Values of Service Protocol Type, Vendor name, Service Type, Link Type, Flags, and Target SSID name, which are included in the response message, are identical to values of Service Protocol Type, Vendor name, Service Type, Link Type, Flags, and Target SSID name, respectively, which are included in a request message transmitted by the P2P device A. Therefore, a description of them will be omitted.

In the response message, the P2P device B designates an intent value of itself for Group Owner Intent, and designates information on a channel selected from among channels of Requested Operating Channel Lists of the request message for a Selected Operating Channel.

Lastly, so as to be able to notify that the P2P device A and the P2P device B have been successful in a result of service discovery, the P2P device B designates a value (i.e., zero) corresponding to Success for a Status Code of the response message as described above with reference to FIG. 3B and FIG. 3C. On the other hand, when the result of service discovery has been unsuccessful, the Status Code may have a value other than zero.

When steps S401a to S405a are completed, after the P2P device A and the P2P device B set a GO and a GC by comparing intent values, they may create a new P2P group between the P2P device A and the P2P device B. According to the first exemplary embodiment of the present invention as described above, although the P2P device corresponding to the P2P group owner in the 1:N P2P group as shown in FIG. 1A does not operate and thus the 1:N P2P group does not operate, the P2P device A and the P2P device B may continuously perform communication through the P2P group created in steps S401a to S405a.

Figure 4B:
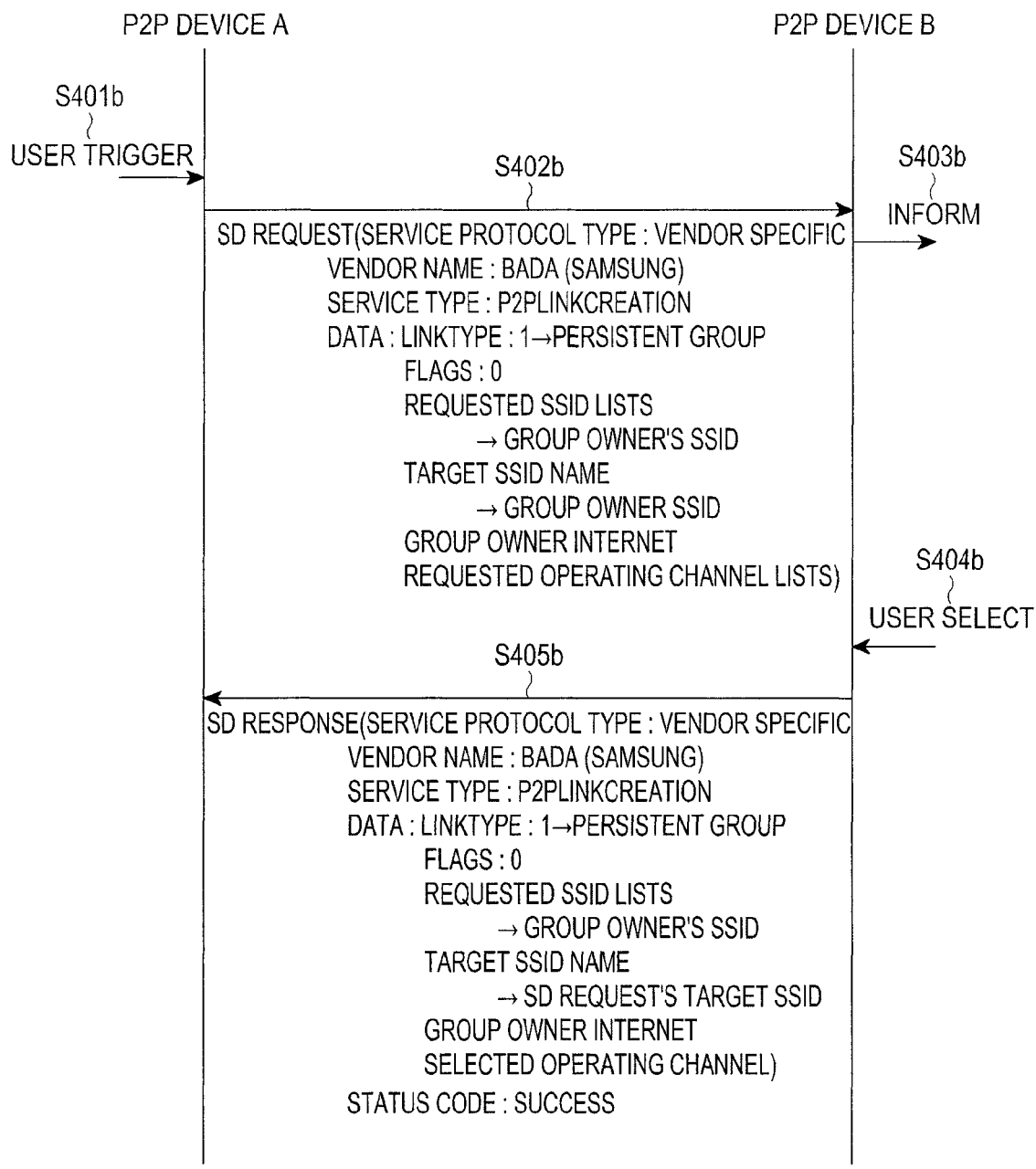
FIG. 4B is a flowchart illustrating a process of creating a P2P group according to a second exemplary embodiment of the present invention.

FIG. 4B is a flowchart illustrating a process of creating a P2P group according to a second exemplary embodiment of the present invention. The second exemplary embodiment of the present invention will be described below based on the description made above with reference to FIG. 1B to FIG. 3C.

The second exemplary embodiment of the present invention will be described with reference to FIG. 1B. The second exemplary embodiment of the present invention pertains to a change of an attribute of a P2P group from a temporary group to a persistent group, in a state where the P2P device and the P2P device B have created the P2P group, an attribute of which is the temporary group.

Referring to FIG. 4B, in steps S401b and S402b, at a request of a user, the P2P device A transmits a request message (e.g., an SD request) suitable for a change of an attribute of a P2P group of the P2P device A and the P2P device B, as described above with reference to FIG. 3A to FIG. 3D.

The P2P device A designates Vendor Specific for a Service Protocol Type, so as to designate the use of a service protocol designated by a manufacturer, and declares Query Data as shown in FIG. 4B and transmits a request message including the Query Data to the P2P device B.

More specifically, Query Data of a request message transmitted in step S402b includes a Vendor name designated as, for example, Bada (or Samsung), and a Service Type is designated as P2PLinkCreation. Also, in the Query Data of the request message, the designation of the value of Flags as 0 enables the request message to notify the update of an attribute of a group, and the designation of the value of a Link Type as 1 enables the request message to notify that the attribute of the P2P group of the P2P device A and the P2P device B is changed from a temporary group to a persistent group (e.g., a group attribute, to which the attribute of the P2P group is to be changed). At this time, the transmission of the request message including a Link Type having a value of 0 and Flags having a value of 0 can be understood as a request for changing the attribute of the P2P group from a persistent group to a temporary group, which is made by the P2P device A.

Also, in the request message, an SSID of a P2P device (e.g. the P2P device A or P2P device B) corresponding to a GO in the P2P group, the update of which has been requested, is designated for Requested SSID Lists and a Target SSID name.

Meanwhile, in the second exemplary embodiment of the present invention, an attribute of a P2P group is changed in a state where the P2P group has been created (e.g., in a state where the P2P device A makes a P2P connection to the P2P device B). Accordingly, Group Owner Intent and Requested Operating Channel Lists may be included in the request message, and then the request message including the Group Owner Intent and the Requested Operating Channel Lists may be transmitted. Otherwise, the request message may be transmitted without including the Group Owner Intent and the Requested Operating Channel Lists. Although the request message including the Group Owner Intent and the Requested Operating Channel Lists is transmitted, it is assumed that the Group Owner Intent and the Requested Operating Channel Lists are not used in the second exemplary embodiment of the present invention.

In steps S403b to S405b, the P2P device B notifies a user of the contents (e.g., the contents of requesting a change of the attribute of the P2P group) of the request message received from the P2P device A. Next, when the user selects a change of the attribute of the P2P group of the P2P device B and the P2P device A, a response message (SD response) matched with the user's selection is transmitted to the P2P device A.

As described above, the second exemplary embodiment of the present invention pertains to a change of the attribute of the already-created P2P group. Accordingly, when the user of the P2P device B allows a change of the attribute of the P2P group in S404b, data (for example, Service Protocol Type and Response Data shown in FIG. 3B) of the response message transmitted in S405b is data matched with the request message transmitted in S402.

Therefore, Service Protocol Type, Vendor name, Service Type, Link Type, Flags, Requested SSID Lists, Target SSID name, and Selected Operating Channel of the response message transmitted by the P2P device B have data values matched with (e.g. identical) the request message transmitted by the P2P device A, respectively. Status Code also has data value (for example, a value of 0 shown in FIG. 3C) corresponding to Success, due to a feature of the second exemplary embodiment of the present invention for changing an attribute of a P2P group.

At this time, although the P2P device B may transmit the response message including an intent value thereof (Group Owner Intent), the intent value thereof is not used in the second exemplary embodiment of the present invention, due to the feature of the second exemplary embodiment of the present invention as described above.

When steps S401b to S405b are completed, the P2P device A and the P2P device B may change the attribute of the P2P group formed by themselves (e.g., may change from a temporary group to a persistent group).

The second exemplary embodiment of the present invention as described above may be used when the user of the P2P device A and a user of a P2P device B subsequently desire to quickly create a P2P group (i.e., when the user of the P2P device A and the user of the P2P device B desire to change an attribute of the P2P group to a persistent group), in consideration of subsequent re-creation of the P2P group of their own P2P devices.

Figure 4C:
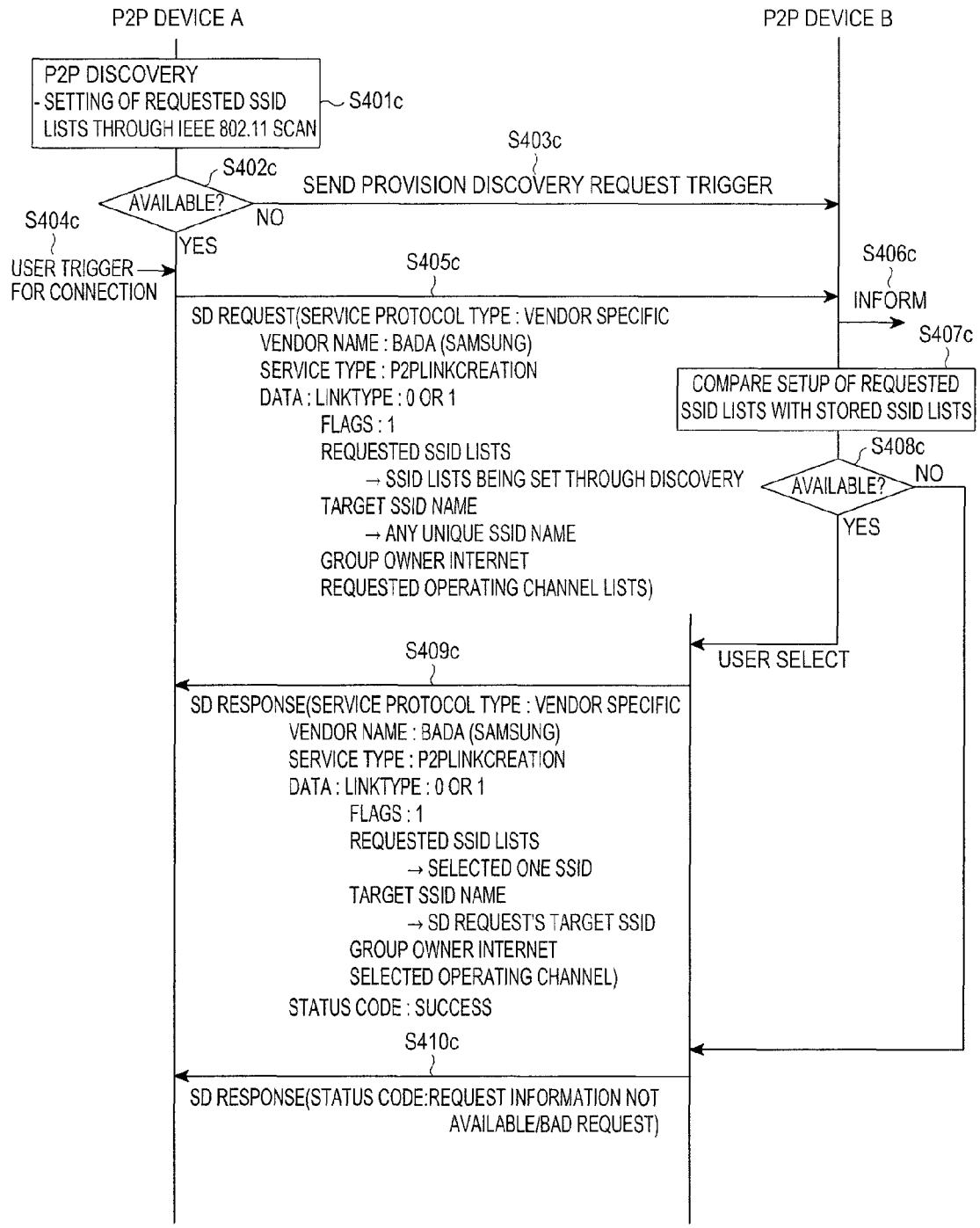
FIG. 4C is a flowchart illustrating a process of creating a P2P group according to a third exemplary embodiment of the present invention.

FIG. 4C is a flowchart illustrating a process of creating a P2P group according to a third exemplary embodiment of the present invention. The third exemplary embodiment of the present invention will be described below based on the description made above with reference to FIG. 1C to FIG. 3C.

The third exemplary embodiment of the present invention will be described with reference to FIG. 1C. The third exemplary embodiment of the present invention pertains to creating a P2P group by using an Access Point (AP) around P2P devices.

Referring to FIG. 4C, in steps S401c and S402c, the P2P device A identifies whether an AP, to which the P2P device A can connect, exists in a stored AP list.

Generally, devices which use Wi-Fi, manage SSIDs of APs, to which the devices have connected, and credentials for the APs, as profiles, and discriminate between profiles, which are matched with APs, respectively, by using a SSID value (e.g., SSID name). Herein, the case of storing a profile of each AP in the form of a list, has an advantage in that a connection speed is improved when a device subsequently connects to the same AP.

Therefore, in steps S401c and S402c, the P2P device A identifies whether the P2P device A can connect to a relevant AP in an AP list of a stored profile, by using channel scan using IEEE 802.11.

In step S403c, when a result of the identification in steps S401c and S402c shows that the relevant AP does not exist in the AP list, the P2P device A initiates a provision discovery according to the existing Wi-Fi Direct specification, and performs a process of creating a P2P group of itself and the P2P device B.

In steps S404c and S405c, when the P2P device A first displays information on the AP identified in steps S401c and S402c to a user and then a request is made for creating a P2P group of itself and the P2P device B by using the displayed AP, the P2P device A transmits a request message matched with the request to the P2P device B.

Service Protocol Type, Vendor name, Service Type, Group Owner Intent, and Requested Operating Channel Lists of the request message (e.g., an SD request) are the same as described above in the first exemplary embodiment and the second exemplary embodiment of the present invention.

Although a value of 0 or 1 may be designated for a Link Type in the request message, it is assumed that a value of 0 is first designated (default) for the Link Type in consideration of users' convenience and an attribute of a P2P group to be created is set to a temporary group. According to the modification of an exemplary embodiment of the present invention, a value of 1 may be first designated for the Link Type. In this case, although a value of 1 is designated for the Link Type and the attribute of the P2P group is set to a temporary group, the attribute of the P2P group may be updated at any time according to the second exemplary embodiment of the present invention. A value of 1 is designated for Flags because a new P2P group is created by the P2P device A and the P2P device B.

Meanwhile, in the request message, an SSID of the AP identified in steps S401c and S402c is designated for Requested SSID Lists, and a Target SSID name is designated as an SSID (discriminated from another SSID) of a P2P group to be created by the P2P device A and the P2P device B.

In steps S406c to S408c, the P2P device B notifies the user that the P2P device A has made a request for creating a P2P group by using a particular AP. When the user allows the request, the P2P device B identifies the SSID of the AP included in the request message transmitted by the P2P device A, and identifies whether an AP matched with the AP included in the request message exists in AP profiles (e.g., AP list) of the P2P device B.

In step S409c, when a result of the identification in step S408c shows that there exists an AP among the AP profiles stored in the P2P device B, which is matched with the SSID of the AP included in the request message received from the P2P device A, the P2P device B transmits a response message matched with the existence of the AP to the P2P device A.

Referring to FIG. 4C, Service Protocol Type, Vendor name, Service Type, and Flags of the response message (e.g., an SD response) are identical to those in the request message, respectively. Although a Link Type of the response message may have a value of 0 or 1, it is assumed that a Link Type of the response message has an identical value to a Link Type of the request message.

Also, Selected Operating Channel and Status Code can be understood as described above in the first exemplary embodiment and the second exemplary embodiment of the present invention. Group Owner Intent and Requested Operating Channel Lists are the same as described above with regard to the first exemplary embodiment and the second exemplary embodiment of the present invention.

Meanwhile, the P2P device B designates an SSID of an AP among AP profiles stored in the P2P device B, which is matched with the SSID of the AP included in the request message received from the P2P device A, for Selected SSID Lists of the response message, and designates a Target SSID name as an identical SSID to a Target SSID name of the request message.

After step S409c, the P2P device A and the P2P device B determine a GO and a GC by comparing intent values, and create a P2P group.

According to the third exemplary embodiment of the present invention as described above, the P2P device A and the P2P device B create a P2P group by using an AP, to which both the P2P device A and the P2P device B can connect. Therefore, it is possible to provide a user with such an advantage that a creation speed is even higher than in the case of creating a P2P group according to the current Wi-Fi Direct specification which requires a lot of time in a device discovery process when a P2P group is first created.

Meanwhile, in step S410c, when the result of the identification in step S408c shows that an SSID of an AP among the AP profiles stored in the P2P device B, which is matched with the SSID of the AP included in the request message received from the P2P device A, does not exists in Selected SSID Lists of the response message, the P2P device B designates the value of a Status Code as 2 or 3 as shown in FIG. 3C and transmits a response message to the P2P device A, so as to notify the P2P device A that it is impossible to create a P2P group by using the AP, to which both the P2P device A and the P2P device B can connect.

When compared with the method for creating a P2P group according to the existing the Wi-Fi Direct specification, exemplary embodiments of the present invention have features which can provide the following effects. Even group client P2P devices can create a new P2P group. It is possible to easily change an attribute of the created P2P group. When P2P devices all store profiles of APs, to which P2P devices can connect, a P2P group can be quickly created by using an AP, to which P2P devices can connect.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for creating a new peer-to-peer (P2P) group, where a 1:N P2P group is created by setting a first device as a group owner and a second device and a third device as group clients, N being an integer greater than 1, the method comprising:
   transmitting, by the second device, a request message for creation of the new P2P group, to the third device;
   receiving, in the second device, a response message to the request message from the third device; and
   creating the new P2P group between the second device and the third device while maintaining connecting the 1:N P2P group among the first, second, and third devices, based on the request message and the response message,
   wherein the created new P2P group does not include the first device, and
   wherein the creating of the new P2P group comprises:
      setting a group owner and a group client of the new P2P group by comparing an intent value of the second device with an intent value of the third device, and
      creating the new P2P group, by one of the second device and the third device to be the group owner of the new P2P group according to the comparison.

2. The method as claimed in claim 1, wherein each of the request message and the response message uses a vendor-specific content field of a generic advertisement service (GAS) protocol frame defined by IEEE 802.11u.

3. The method as claimed in claim 2, wherein the request message comprises:
   a service protocol type comprising a vendor specific value and designating that a service protocol designated by a manufacturer is to be used;
   a vendor name designating a name of a manufacturer;
   a service type designating that the request message is related to a formation of a P2P link;
   requested service set identifier (SSID) lists comprising an SSID of the first device;
   a target SSID name comprising an SSID of the new P2P group;
   a group owner intent comprising the intent value of the second device;
   requested operating channel lists comprising information on a list of available operating channels;
   a link type designating a group attribute of the new P2P group; and
   flags designating that the request message is matched with the creation of the new P2P group.

4. The method as claimed in claim 3, wherein the response message comprises:
   the service protocol type;
   the vendor name;
   the service type;
   a selected SSID comprising an SSID selected from among the requested SSID lists;
   the target SSID name;
   a group owner intent comprising the intent value of the third device;

a selected operating channel comprising information on an operating channel selected from among the requested operating channel lists;
the link type; and
the flags.

* * * * *